(No Model.) 2 Sheets—Sheet 1.
S. B. JEROME.
CAR WHEEL.
No. 395,568. Patented Jan. 1, 1889.
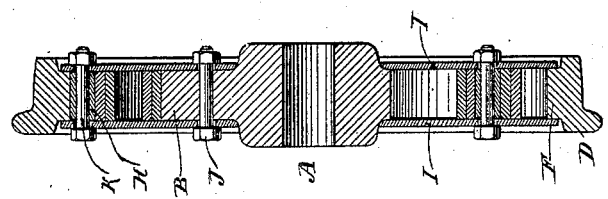
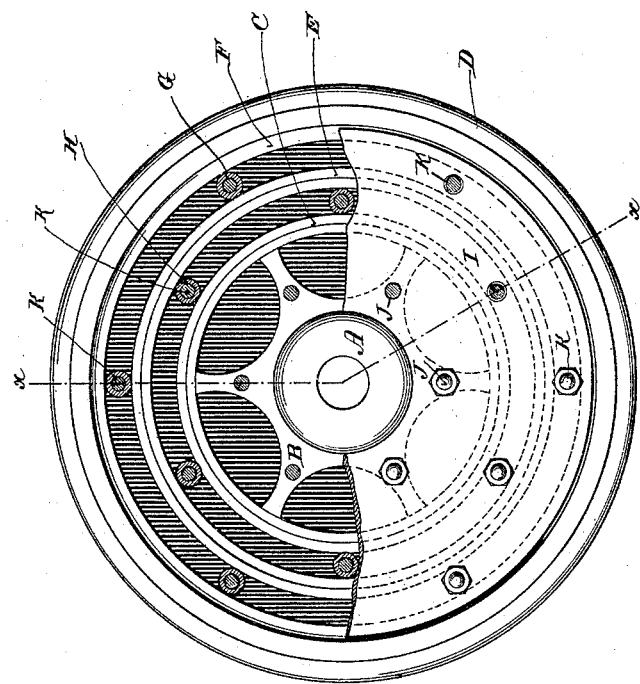
WITNESSES:
Robt F. Gaylord
Frank B. Murphy
INVENTOR
Samuel B. Jerome
BY
Duncan, Curtis & Page
ATTORNEYS.

(No Model.) 2 Sheets—Sheet 2.
S. B. JEROME.
CAR WHEEL.
No. 395,568. Patented Jan. 1, 1889.
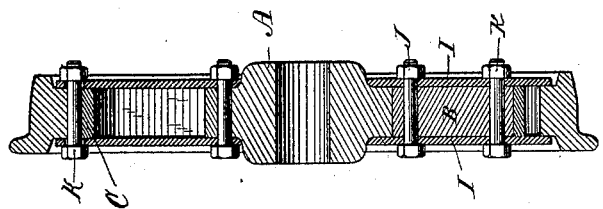
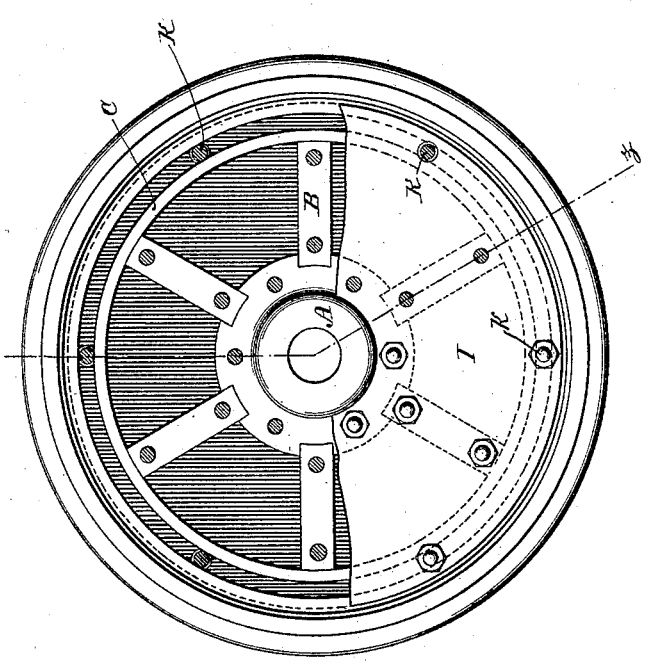
WITNESSES:
Robt F Gaylord
Frank B. Murphy.
INVENTOR
Samuel B. Jerome
BY
Duncan, Curtis & Page
ATTORNEYS.

UNITED STATES PATENT OFFICE.

SAMUEL B. JEROME, OF NEW YORK, N. Y., ASSIGNOR OF ONE-HALF TO THOMAS F. ROWLAND, OF SAME PLACE.

CAR-WHEEL.

SPECIFICATION forming part of Letters Patent No. 395,568, dated January 1, 1889.

Application filed September 15, 1888. Serial No. 285,479. (No model.)

*To all whom it may concern:*

Be it known that I, SAMUEL B. JEROME, of the city, county, and State of New York, have invented certain new and useful Improvements in Car-Wheels, of which the following is a full, clear, and exact description, reference being had to the accompanying drawings.

This invention relates to car-wheels that have an elastic or yielding tire—that is, to car-wheels in which the tire is attached to the hub of the wheel by connections that permit the tire to yield slightly from its normal position concentric with the hub or axis. This is for the purpose of counteracting the shocks and blows struck upon the tire of the wheel when in use, and to reduce the consequent effects of wear both upon the wheel and its axle and their supporting parts.

The invention consists of a wheel provided with a circular spring or springs arranged concentric to the axis thereof and located between the hub and tire, the bearing-points of the tire portion of the wheel upon said spring being intermediate to the points where the spring bears upon the hub portion of the wheel.

In the drawings, Figure 1 is a face view of a wheel embodying my improvements, the side plate being partially sectioned away to exhibit the parts beneath. The wheel shown in these figures is a car-wheel or a wheel adapted to similar work. Fig. 2 is a section of the same on the plane $x\,x$ of Fig. 1. Fig. 3 is a face view of a modified form of wheel; and Fig. 4 is a section of the same on line $z\,z$ of Fig. 3, the wheel of these figures being one adapted to use on horse-cars and other vehicles lighter than railway-cars.

Referring to these views in detail, A represents the hub of the wheel, which may be of any suitable form or construction. In Figs. 1 and 2 I have shown the hub as made solid and provided with spokes or radial projections B. Upon the peripheral face or ends of these spokes is arranged the annular steel spring C, which is concentric with the axis of the hub. In the present case this spring is a compound or double spring, composed of two springs of approximately the same thickness. It is to be noted that the bearing of the inner face of this hub-spring upon the hub portions of the wheel is not continuous around the same—that is, the spring bears upon the hub portion at separate points or places—that is, upon the ends of the radial projections or spokes—and is free to bend inward toward the hub between such bearing-points.

D represents the tire, and E the annular tire-spring. The tire may be of any approved form and construction; but it will ordinarily be of a form similar to that shown—that is, consisting of a tread portion, D, and an inner tongue, F. Between the tongue of the tire and the outer face of the steel springs E, which are in form and arrangement similar to the spring C, are placed the bearing-sleeves G, and between the springs C and E are similar bearings, H. These sleeves form bearings between the springs and between the outer face of the larger spring and the tire, and serve to keep them properly separated. It is essential that these sleeves be intermediately arranged—that is, the sleeves H are arranged between the positions of the hub-bearings B, and the bearings G are arranged between the positions of the bearings H.

I represents the side or face plates of the wheel. These plates are bolted rigidly to the hub at J, and are secured together and perfectly hold the other parts in proper relation through the medium of the bolts K, these bolts passing through the sleeves G and H.

The bolt-holes K in the face-plates are somewhat larger than the bolts that pass through them, and this is for the purpose of permitting the bolts to have slight play as the springs are compressed and as they expand. The length of the sleeves G and H is slightly greater than the width of the springs, and is the same as the transverse thickness of the spokes, so that the side plates will bear upon such sleeves rather than the springs, thus giving a solid support for the side plates without any pressure against or interference with the free movement of the elastic rings. The diameter of the side plates is also less than the inner diameter of the tread of the tire to permit the elastic movement of the tire when in use.

The operation will now be plain. The elasticity of the springs is continually brought into play when the wheel is revolving, thus giving an easy yielding motion at all times, that counteracts the effects of shocks and jars and correspondingly reduces the wear of the parts of the running mechanism.

The manner of holding the tire between the side plates will, in case of severe torsional straining upon the axle, obviate the liability of twisting and consequent crystallization and fracture by reason of such strains, for when the strain upon the axle, upon curves or under other conditions, becomes greater than the frictional resistance of the side plates pressing against the sides of the tongue of the tire, the tire itself will yield to a limited extent, changing its circumferential position relatively to the axle, the hub, and the side plates, according to the amount of slip upon the rail that would be inevitable with the ordinary wheel under similar conditions. Suitable packing may be placed between the inner edges of the side plates and the sides of the tire-tongue to prevent wear and to secure a uniform degree of service whenever the independent movement of the tire is necessary. The axle, the hubs, the side plates, and the rings of both wheels upon the same axle will revolve together with the same rapidity, while the tires of the two wheels can revolve independently and at varying rapidity according to the greater or less distance to be traveled upon curves or under any other unusual conditions.

In Figs. 3 and 4 a single annular spring is shown, as this form of wheel is lighter than that of Figs. 1 and 2, being particularly adapted to horse-cars and similar vehicles. The spokes B may be of wood where such material is suitable, and the other parts may variously be changed in form to adapt the wheel to lighter work than that of a car-wheel; but the manner of using the elastic spring C will be substantially the same as in the case of a car-wheel.

What is claimed as new is—

1. In a car-wheel, the combination, with a hub and tire, of an annular spring arranged between the same, bearings for the spring arranged between the inner face thereof and the hub, and similar bearings arranged between the outer face of the spring and the tire, and located intermediate to the positions of the bearings on the hub.

2. In a car-wheel, the combination, with the hub and tire, of an annular spring arranged between the same, bearings for the spring, arranged between the inner face thereof and the hub, similar bearings arranged between the outer face of the spring and the tire and located intermediate to the position of the bearings on the hub, and side plates bolted to the hub and to each other.

3. In combination, in a car-wheel, a hub having radial projections, an annular spring supported upon the projections, cylindrical sleeves arranged between the springs and the tire and located intermediate to the positions of the said projections, and side plates which are bolted to the hub and to each other through said sleeves.

SAMUEL B. JEROME.

Witnesses:
ROBT. F. GAYLORD,
FRANK B. MURPHY.